(12) United States Patent
Sawada et al.

(10) Patent No.: US 8,250,869 B2
(45) Date of Patent: Aug. 28, 2012

(54) EXHAUST HEAT RECOVERY APPARATUS

(75) Inventors: Daisaku Sawada, Gotenba (JP); Shinichi Mitani, Susono (JP); Hiroshi Yaguchi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 613 days.

(21) Appl. No.: 12/281,025

(22) PCT Filed: Feb. 28, 2007

(86) PCT No.: PCT/IB2007/000481
§ 371 (c)(1),
(2), (4) Date: Dec. 30, 2008

(87) PCT Pub. No.: WO2007/099438
PCT Pub. Date: Sep. 7, 2007

(65) Prior Publication Data
US 2009/0094980 A1    Apr. 16, 2009

(30) Foreign Application Priority Data
Mar. 1, 2006 (JP) ................... 2006-055437

(51) Int. Cl.
*F02G 3/00* (2006.01)
*F01B 29/08* (2006.01)
*F01K 25/00* (2006.01)
(52) U.S. Cl. ................ 60/624; 60/516; 60/616
(58) Field of Classification Search ............ 60/516–526, 60/614–624, 700–703; 290/1 R
See application file for complete search history.

(56) References Cited

U.S. PATENT DOCUMENTS

| 5,146,750 A | 9/1992 | Moscrip |
| 6,450,283 B1 * | 9/2002 | Taggett .................. 180/304 |
| 6,543,229 B2 | 4/2003 | Johansson |

(Continued)

FOREIGN PATENT DOCUMENTS
EP    1 243 758 A1    9/2002
(Continued)

OTHER PUBLICATIONS
Office Action for U.S. Appl. No. 11/715,470 mailed Jan. 22, 2010.
(Continued)

*Primary Examiner* — Thomas Denion
*Assistant Examiner* — Chistopher Jetton
(74) *Attorney, Agent, or Firm* — Finnegan, Henderson, Farabow, Garrett & Dunner, LLP

(57) ABSTRACT

An exhaust heat recovery apparatus includes a Stirling engine and a clutch. The Stirling engine produces motive power by recovering thermal energy from exhaust gas discharged from an internal combustion engine from which exhaust heat is recovered. The motive power produced by the Stirling engine is transmitted to an internal combustion engine transmission through the clutch and an exhaust heat recovery device transmission, and combined with the motive power produced by the internal combustion engine through the internal combustion engine transmission, and is output from an output shaft. If rapid acceleration is required, and the increase in the rotation speed of the Stirling engine therefore lags behind the increase in the rotation speed of the internal combustion engine, the clutch is released. With this configuration, reduction in the power output from the heat engine, from which exhaust heat is recovered, is restricted, and the degradation of the acceleration performance is minimized.

9 Claims, 11 Drawing Sheets

U.S. PATENT DOCUMENTS

| | | | |
|---|---|---|---|
| 6,651,433 B1 | 11/2003 | George, Jr. | |
| 6,725,662 B2 * | 4/2004 | Baba et al. | 60/620 |
| 2005/0194940 A1 | 9/2005 | Aldridge | |
| 2007/0204611 A1 * | 9/2007 | Sawada et al. | 60/520 |

FOREIGN PATENT DOCUMENTS

| | | |
|---|---|---|
| JP | 1-257722 | 10/1989 |
| JP | 2-108809 | 4/1990 |
| JP | 2-157423 | 6/1990 |
| JP | 2-207139 | 8/1990 |
| JP | 5-38956 | 2/1993 |
| JP | 2003-518458 | 6/2003 |
| JP | 2004-332665 | 11/2004 |
| JP | 2005-90376 | 4/2005 |
| JP | 2005-113719 | 4/2005 |
| WO | WO 90/09515 | 8/1990 |

OTHER PUBLICATIONS

Notification of Reason(s) for Refusal for JP Appl. No. 2006-055437 issued Aug. 31, 2010.

* cited by examiner

EXHAUST HEAT RECOVERY APPARATUS

CROSS-REFERENCE TO RELATED APPLICATIONS

This application is a national phase application of International Application No. PCT/IB2007/000481, filed Feb. 28, 2007, and claims the priority of Japanese Application No. 2006-055437, filed Mar. 1, 2006, the contents of both of which are incorporated herein by reference.

BACKGROUND OF THE INVENTION

1. Field of the Invention

The present invention relates to an exhaust heat recovery apparatus that recovers the exhaust heat from a heat engine.

2. Description of the Related Art

An exhaust heat recovery apparatus is available that, using a heat engine, recovers the exhaust heat from an internal combustion engine that is mounted on a vehicle, such as a passenger car, a bus and a truck. With regard to the exhaust heat recovery apparatus used for such a purpose, external combustion engines, such as the Stirling engine, which is excellent in theoretical thermal efficiency, are used, for example. Japanese Patent Application Publication No. 2003-518458 (JP-A-2003-518458) discloses a technology in which a clutch is provided between the internal combustion engine and the Stirling engine.

In an external combustion engine, such as the Stirling engine, the heat input from a heat source, such as the exhaust gas, is transferred to a working fluid of the external combustion engine through a heat exchanger. Accordingly, an external combustion engine is less responsive to the variation of heat input, and the output therefrom is slow in following a rapid variation of heat input. In addition, because an exhaust heat recovery system uses a low-quality heat source, such as the exhaust gas from a heat engine, the obtained power output is low relative to the size of the exhaust heat recovery system. As a result, in a case where the rotation speed of the heat engine rapidly increases because rapid acceleration is required, for example, if it is attempted to increase the rotation speed of the exhaust heat recovery means with the rotation speed of the heat engine, it may be impossible to obtain the sufficient motive power to increase the rotation speed of the exhaust heat recovery means through exhaust heat recovery. Thus, in the configuration in which the motive power from the exhaust heat recovery means and the motive power from the heat engine are output, it is possible that the heat engine drives the exhaust heat recovery means, and that the motive power from the heat engine is used by the exhaust heat recovery means. As a result, the power output from the heat engine can be reduced, and it is possible that required acceleration cannot be obtained.

In JP-A-2003-518458, there is no mention of the above problem concerning the configuration in which the motive power from the exhaust heat recovery means and the motive power from the heat engine are output, and there is yet room for improvement.

SUMMARY OF THE INVENTION

In consideration of the above problem, the present invention provides an exhaust heat recovery apparatus that minimizes the degradation of the acceleration performance by suppressing the reduction in the power output from the heat engine when the increase in the rotation speed of the exhaust heat recovery means lags behind the increase in the rotation speed of the heat engine, from which exhaust heat is recovered.

An exhaust heat recovery apparatus according to the present invention includes: exhaust heat recovery means that produces motive power by recovering thermal energy from exhaust gas from a heat engine, wherein the produced motive power is output together with motive power produced by the heat engine; and rotation speed ratio-changing means that transmits the motive power produced by the exhaust heat recovery means, and changes a ratio of a rotation speed of the exhaust heat recovery means to a rotation speed of the heat engine.

The above exhaust heat recovery apparatus includes the rotation speed ratio changing means that transmits the motive power produced by the exhaust heat recovery means to the heat engine, and changes the ratio Ns/Ne of the rotation speed Ns of the exhaust heat recovery means to the rotation speed Ne of the heat engine. Thus, when the increase in the rotation speed of the exhaust heat recovery means lags behind the increase in the rotation speed of the heat engine, from which exhaust heat is recovered, it is possible to set the rotation speed ratio Ns/Ne smaller than that when the increase in the rotation speed of the exhaust heat recovery means follows the increase in the rotation speed of the heat engine. As a result, even if the increase in the rotation speed of the exhaust heat recovery means lags behind the increase in the rotation speed of the heat engine, from which exhaust heat is recovered, it is possible to reduce the possibility that the exhaust heat recovery means uses the motive power produced by the heat engine, so that it is possible to minimize the degradation of the acceleration performance by suppressing the reduction in the power output from the heat engine.

According to another aspect of the present invention, an exhaust heat recovery apparatus according to the present invention includes: exhaust heat recovery means that produces motive power by recovering thermal energy from exhaust gas from a heat engine, wherein the produced motive power is output together with motive power produced by the heat engine; and rotation speed ratio-changing means that, when increase in the rotation speed of the exhaust heat recovery means lags behind increase in the rotation speed of the heat engine, sets the ratio of the rotation speed of the exhaust heat recovery means to the rotation speed of the heat engine smaller than that when the increase in the rotation speed of the exhaust heat recovery means follows the increase in the rotation speed of the heat engine.

When the increase in the rotation speed of the exhaust heat recovery means lags behind the increase in the rotation speed of the heat engine, from which exhaust heat is recovered, the exhaust heat recovery apparatus sets the rotation speed ratio Ns/Ne smaller than that when the increase in the rotation speed of the exhaust heat recovery means follows the increase in the rotation speed of the heat engine. As a result, even if the increase in the rotation speed of the exhaust heat recovery means lags behind the increase in the rotation speed of the heat engine, from which exhaust heat is recovered, it is possible to reduce the possibility that the exhaust heat recovery means uses the motive power produced by the heat engine, so that it is possible to minimize the degradation of the acceleration performance by suppressing the reduction in the power output from the heat engine.

It is also preferable that, in the exhaust heat recovery apparatus, the rotation speed ratio-changing means be a clutch that is provided between the heat engine and the exhaust heat recovery means, wherein, when the increase in the rotation speed of the exhaust heat recovery means lags behind the increase in the rotation speed of the heat engine, the clutch is released.

It is also preferable that the exhaust heat recovery apparatus further includes a one-way clutch, provided between the exhaust heat recovery means and the heat engine, for transmitting motive power from the exhaust heat recovery means to the heat engine.

It is also preferable that, in the exhaust heat recovery apparatus, the rotation speed ratio-changing means be speed-changing means provided between the heat engine and the exhaust heat recovery means, wherein the rotation speed ratio is changed by changing the speed ratio of the speed-changing mean.

It is also preferable that, in the exhaust heat recovery apparatus, when the increase in the rotation speed of the exhaust heat recovery means lags behind the increase in the rotation speed of the heat engine, the rotation speed ratio-changing means set the rotation speed ratio so that the rotation speed of the exhaust heat recovery means becomes a rotation speed less than that when the increase in the rotation speed of the exhaust heat recovery means follows the increase in the rotation speed of the heat engine.

It is also preferable that, in the exhaust heat recovery apparatus, when the increase in the rotation speed of the exhaust heat recovery means lags behind the increase in the rotation speed of the heat engine, the rotation speed ratio-changing means set the rotation speed of the exhaust heat recovery means to a minimum rotation speed at which the exhaust heat recovery means can operate.

It is also preferable that, in the exhaust heat recovery apparatus, when the increase in the rotation speed of the exhaust heat recovery means lags behind the increase in the rotation speed of the heat engine, the rotation speed ratio-changing means set the rotation speed ratio so that the rotation speed of the exhaust heat recovery means becomes a rotation speed at which the exhaust heat recovery means produces the maximum motive power.

It is also preferable that, when a time period for which rapid acceleration has not been required of the heat engine exceeds a predetermined time period, the rotation speed ratio-changing means set the rotation speed ratio so that the exhaust heat recovery means produces the maximum motive power.

When the heat engine is rapidly accelerated may be when the increase in the rotation speed of the exhaust heat recovery means lags behind the increase in the rotation speed of the heat engine.

It may also be preferable that, when an accelerator pedal operation amount-differential value is greater than an accelerator pedal operation amount-threshold value, it be determined that the heat engine is rapidly accelerated. It may also be preferable that, when a required driving force-differential value is greater than a required driving force-threshold value, it be determined that the heat engine is rapidly accelerated.

The exhaust heat recovery apparatus according to the present invention minimizes the degradation of the acceleration performance by suppressing the reduction in the power output from the heat engine, from which exhaust heat is recovered, even if the increase in the rotation speed of the exhaust heat recovery means lags behind the increase in the rotation speed of the heat engine, from which exhaust heat is recovered, as described above.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. The components of the embodiments include ones that those skilled in the art would easily think of, and ones that are substantially the same as the former ones. The description given below illustrates a case where a Stirling engine is used as an exhaust heat recovery means to recover thermal energy from the exhaust gas discharged from an internal combustion engine, which functions as a heat engine. In addition to the Stirling engine, another exhaust heat recovery device, such as one using the Brayton cycle, may be used as the exhaust heat recovery means. The type of heat engine is arbitrary.

First, a first embodiment will be described. In the first embodiment, a rotation speed ratio-changing means that transmits the motive power produced by the exhaust heat recovery means to the heat engine, and changes the ratio (rotation speed ratio) of the rotation speed of the Stirling engine to the rotation speed of the internal combustion engine, is provided between an internal combustion engine, which functions as a heat engine, and a Stirling engine, which functions as an exhaust heat recovery means. A feature is that, when the increase in the rotation speed of the Stirling engine lags behind the increase in the rotation speed of the internal combustion engine, the rotation speed ratio is set smaller than that when the increase in the rotation speed of the Stirling engine follows the increase in the rotation speed of the internal combustion engine. "When the increase in the rotation speed of the Stirling engine follows the increase in the rotation speed of the internal combustion engine" implies "when the motive power from the internal combustion engine is not used by the Stirling engine when the rotation speed of the Stirling engine increases as the rotation speed of the internal combustion engine increases." "When the increase in the rotation speed of the Stirling engine lags behind the increase in the rotation speed of the internal combustion engine" implies "when the Stirling engine is driven by the internal combustion engine, so that the Stirling engine applies a load to the internal combustion engine, that is, uses the motive power from the internal combustion engine, when the rotation speed of the Stirling engine increases as the rotation speed of the internal combustion engine increases." The exhaust heat recovery means according to the first embodiment will be described.

Figure 1:
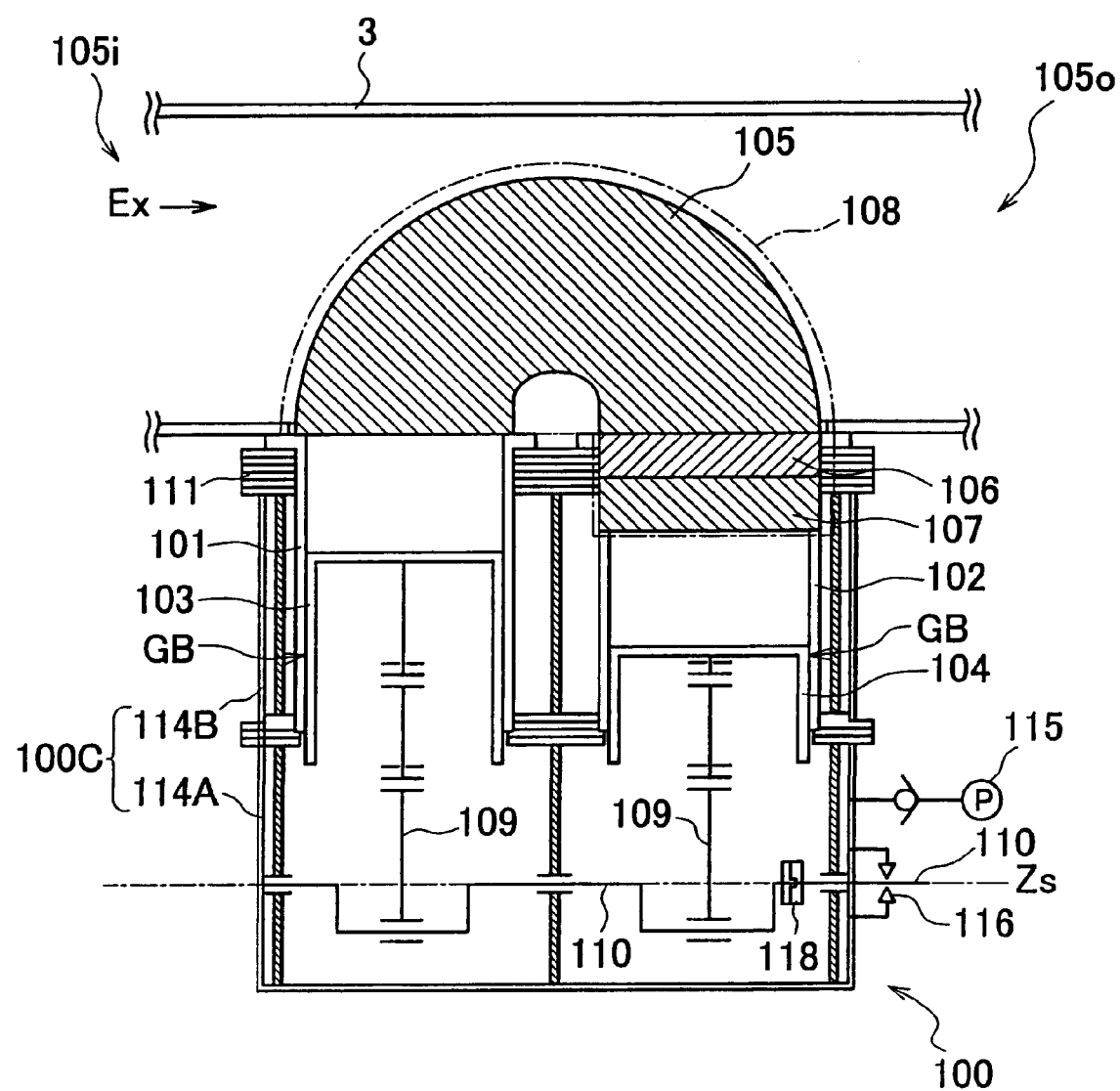
FIG. 1 is a sectional view showing the Stirling engine, which functions as an exhaust heat recovery means of an exhaust heat recovery apparatus of the first embodiment as an example embodiment of the present invention.
Figure 2:
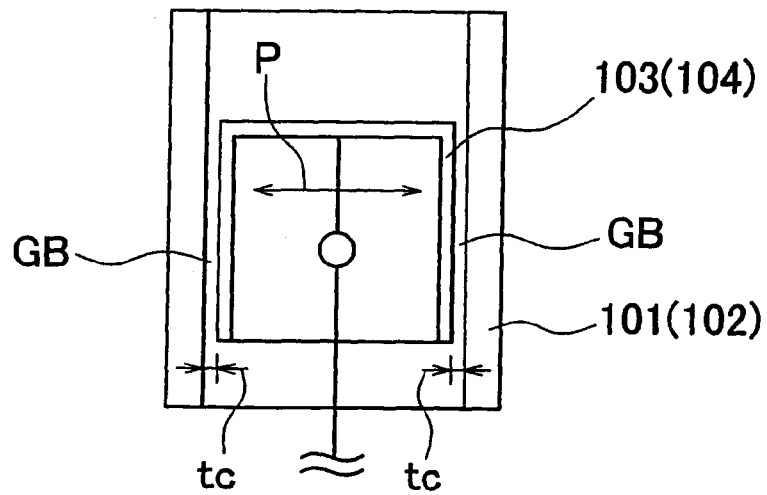
FIG. 2 is a sectional view showing an example of the construction of an air bearing that the Stirling engine includes, which functions as the exhaust heat recovery means of the exhaust heat recovery apparatus of the first embodiment.
Figure 3:
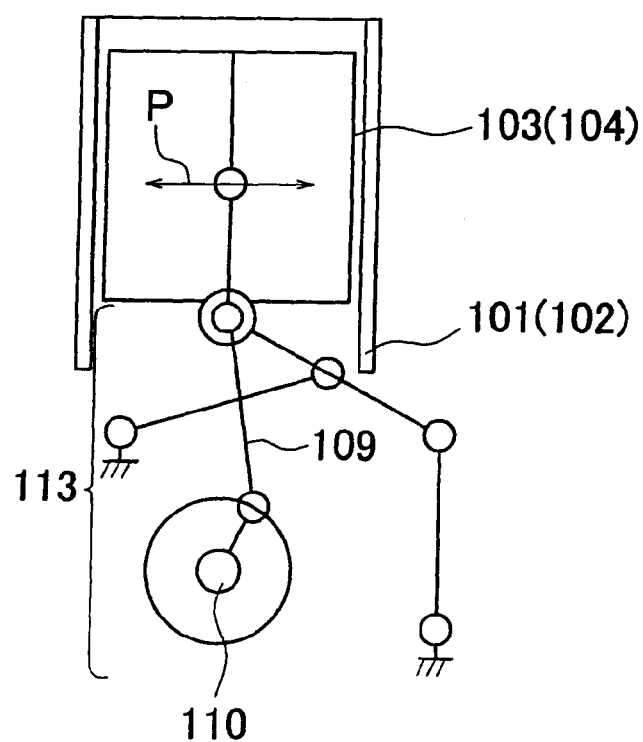
FIG. 3 is an explanatory diagram showing an example of an approximately linear motion linkage, which is used to support a piston.

FIG. 1 is a sectional view showing the Stirling engine, which functions as the exhaust heat recovery means of the first embodiment. FIG. 2 is a sectional view showing an example of the construction of an air bearing that the Stirling engine includes, which functions as the exhaust heat recovery means of the first embodiment. FIG. 3 is an explanatory diagram showing an example of an approximately linear motion linkage, which is used to support a piston. The Stirling engine 100, which functions as the exhaust heat recovery means of the first embodiment, is a so-called α-type in-line two-cylinder Stirling engine. In the Stirling engine 100, arranged in an in-line arrangement are: a high temperature-side piston 103, which is a first piston, housed in a high temperature-side cylinder 101, which is a first cylinder; and a low temperature-side piston 104, which is a second piston, housed in a low temperature-side cylinder 102, which is a second cylinder.

The high temperature-side cylinder 101 and the low temperature-side cylinder 102 are directly or indirectly supported by, or fixed to a base plate 111, which functions as a reference body. In the Stirling engine 100 of the first embodiment, the base plate 111 serves as a positional reference of the components of the Stirling engine 100. With this configuration, it is made possible to ensure the accuracy of the relative position between the components. In addition, as described later, in the Stirling engine 100 of the first embodiment, respective gas bearings GB are interposed between the high temperature-side cylinder 101 and the high temperature-side piston 103, and between the low temperature-side cylinder 102 and the low temperature-side piston 104.

By fixing the high temperature-side cylinder 101 and the low temperature-side cylinder 102 directly or indirectly to the base plate 111, which functions as the reference body, it is possible to maintain the clearance between the piston and the cylinder with precision. Thus, the function of the gas bearings GB is satisfactorily carried out. In addition, it becomes easy to assemble the Stirling engine 100.

A heat exchanger 108 constituted of a substantially U-shaped heater 105, a regenerator 106, and a cooler 107 is disposed between the high temperature-side cylinder 101 and the low temperature-side cylinder 102. If the heater 105 is formed in a substantially U-shape in this way, it is possible to easily dispose the heater 105 even in a relatively narrow space, such as in the exhaust gas passage of the internal combustion engine. In addition, the high temperature-side cylinder 101 and the low temperature-side cylinder 102 are arranged in an in-line arrangement as in the case of the Stirling engine 100, it is possible to relatively easily dispose the heater 105 even in a cylindrical space, such as in the exhaust gas passage of the internal combustion engine.

One end of the heater 105 is positioned next to the high temperature-side cylinder 101, and the other end thereof is positioned next to the regenerator 106. One end of the regenerator 106 is positioned next to the heater 105, and the other end thereof is positioned next to the cooler 107. One end of the cooler 107 is positioned next to the regenerator 106, and the other end thereof is positioned next to the low temperature-side cylinder 102.

A working fluid (air in the first embodiment) is confined in the high temperature-side cylinder 101, the low temperature-side cylinder 102 and the heat exchanger 108, and realizes the Stirling cycle with the heat supplied from the heater 105 and the heat discharged from the cooler 107 to drive the Stirling engine 100. The heater 105 and the cooler 107 may be formed by bundling a plurality of tubes made of a material that has high thermal conductivity and excellent thermal resistance, for example. The regenerator 106 may be made of a porous heat storage unit. The composition of the heater 105, the cooler 107 and the regenerator 106 is not limited to this example. Specifically, the composition may be suitably selected depending on the thermal conditions of the subject from which exhaust heat is recovered, the specifications of the Stirling engine 100, etc.

The high temperature-side piston 103 and the low temperature-side piston 104 are supported in the high temperature-side cylinder 101 and the low temperature-side cylinder 102, respectively, with the respective gas bearings GB interposed therebetween. In other words, the piston is supported in the cylinder without any piston rings. In this way, it is possible to reduce the friction between the piston and the cylinder, thereby improving the thermal efficiency of the Stirling engine 100. In addition, the reduction in the friction between the piston and the cylinder makes it possible to recover thermal energy by operating the Stirling engine 100 even under the operating conditions of a low-temperature heat source and low temperature difference, such as in the case of the exhaust heat recovery of the internal combustion engine.

In order to form the gas bearing GB, the clearance tc shown in FIG. 2 between the high temperature-side piston 103 and the high temperature-side cylinder 101 is set to a few tens of microns all around the high temperature-side piston 103. The low temperature-side piston 104 and the low temperature-side cylinder 102 have a similar configuration. The high temperature-side cylinder 101, the high temperature-side piston 103, the low temperature-side cylinder 102 and the low temperature-side piston 104 may be made of an easily worked, metallic material, for example.

The reciprocation of the high temperature-side piston 103 and the low temperature-side piston 104 is transmitted to a crankshaft 110, which functions as an output shaft, through a connecting rod 109, and converted into rotational motion. The connecting rod 109 may be supported by an approximately linear motion linkage (a grasshopper linkage, for example) 113 shown in FIG. 3. Such a linkage allows the high temperature-side piston 103 and the low temperature-side piston 104 to reciprocate substantially linearly. If the connecting rod 109 is supported by the approximately linear motion linkage 113 in this way, the side force P (the force in the radial direction of the piston) exerted on the high temperature-side piston 103 becomes substantially zero, so that it is possible to satisfactorily support the piston using a gas bearing GB that has a small load capacity.

As shown in FIG. 1, the components of the Stirling engine 100, such as the high temperature-side cylinder 101, the high temperature-side piston 103, the connecting rod 109 and the crankshaft 110, are housed in a housing 100C. The housing 100C of the Stirling engine 100 includes a crankcase 114A and a cylinder block 114B. A pressurizing means 115 increases the pressure in the exhaust heat recovery means-side housing 100C. The purpose of this is to pressurize the working fluid in the high temperature-side cylinder 101, the low temperature-side cylinder 102 and the heat exchanger 108 to obtain more power output from the Stirling engine 100.

In the Stirling engine 100 of the first embodiment, a sealed bearing 116 is fitted to the housing 100C, and supports the crankshaft 110. The power output from the crankshaft 110 is output from the housing 100C through a flexible coupling 118, such as an Oldham's coupling. Next, the configuration of the exhaust heat recovery apparatus according to the first embodiment will be described.

Figure 4:
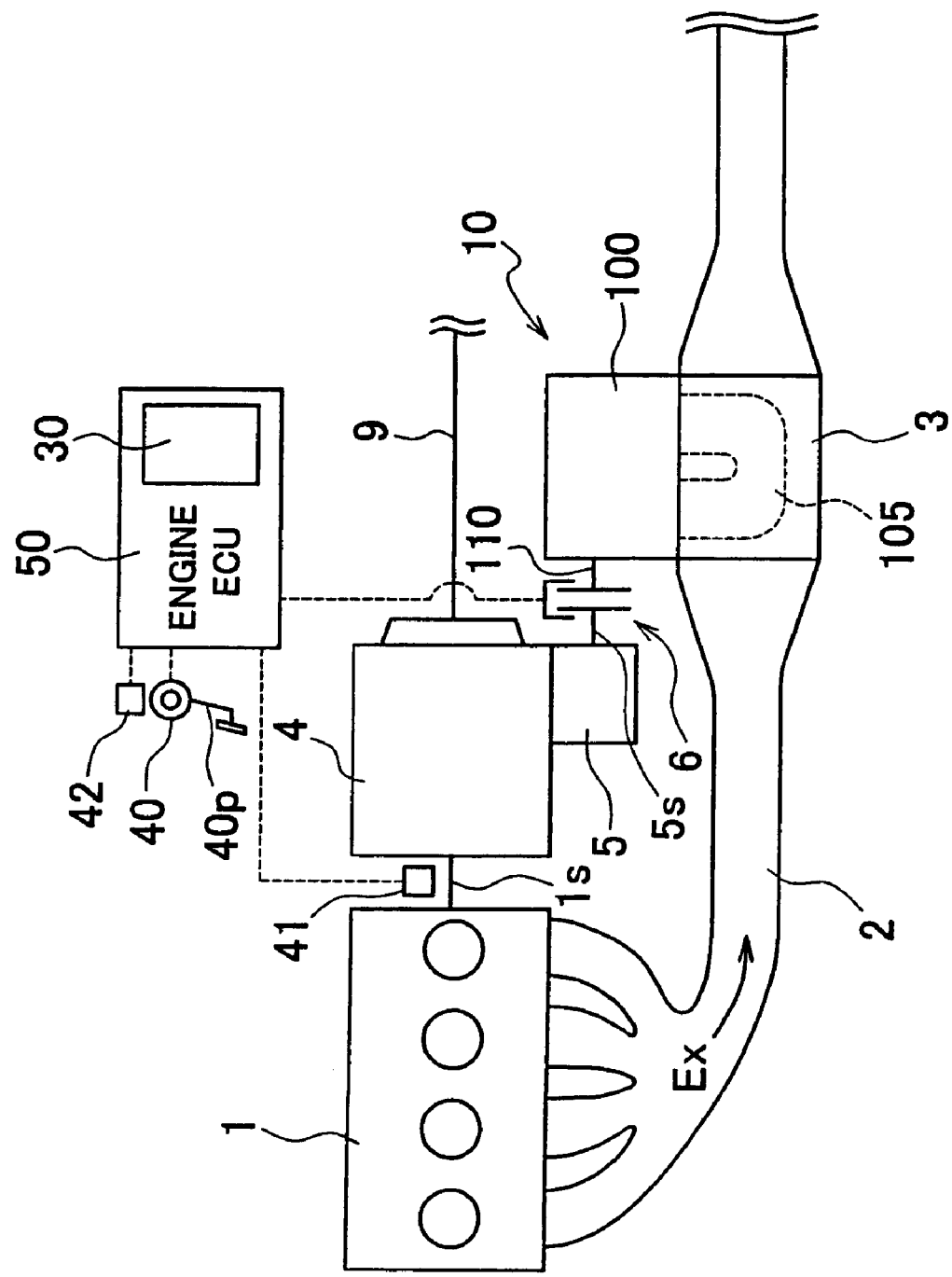
FIG. 4 is an overall view showing a configuration of the exhaust heat recovery apparatus of the first embodiment.

FIG. 4 is an overall view showing a configuration of the exhaust heat recovery apparatus according to the first embodiment. The exhaust heat recovery apparatus 10 according to the first embodiment includes the exhaust heat recovery means, and the rotation speed ratio-changing means, which is provided between the output shaft of the heat engine and the output shaft of the exhaust heat recovery means. In the first embodiment, the above-described Stirling engine 100 is used as the exhaust heat recovery means, and a reciprocating internal combustion engine 1 is used as the heat engine. A clutch 6 is used as the rotation speed ratio-changing means.

The internal combustion engine 1 and the exhaust heat recovery apparatus 10 are mounted on a vehicle, such as a passenger car and a truck, and used as motive power sources of the vehicle, for example. The internal combustion engine 1 serves as a main motive power source and constantly produces motive power while the vehicle is running. The Stirling engine 100 cannot produce a minimum necessary amount of motive power until the temperature of the exhaust gas Ex reaches a certain temperature. Thus, the Stirling engine 100 produces the motive power using the thermal energy recovered from the exhaust gas Ex from the internal combustion engine 1 and drives the vehicle in cooperation with the internal combustion engine 1 after the temperature of the exhaust gas Ex exceeds a predetermined temperature. In this way, the Stirling engine 100 serves as a secondary motive power source of the vehicle.

The heater 105 that the Stirling engine 100 includes is disposed in an exhaust gas passage 2 of the internal combustion engine 1. The regenerator (see FIG. 1) 106 of the Stirling engine 100 may also be disposed in the exhaust gas passage 2. The heater 105 that the Stirling engine 100 includes is provided in a hollow heater case 3, which is provided on the exhaust gas passage 2.

In the first embodiment, the thermal energy of the exhaust gas Ex recovered using the Stirling engine 100 is converted into kinetic energy by the Stirling engine 100. The crankshaft 110, which functions as the output shaft of the Stirling engine 100, is fitted with the clutch 6, which functions as the rotation speed ratio-changing means. The motive power from the Stirling engine 100 is transmitted to a transmission 5 for the exhaust heat recovery means through the clutch 6. An output shaft $1s$ of the internal combustion engine 1 is connected to a transmission 4 for the internal combustion engine. The internal combustion engine transmission 4 combines the motive power from the internal combustion engine 1 and the motive power from the Stirling engine 100, which is output from the exhaust heat recovery means transmission 5, and outputs the resultant motive power to an output shaft 9. The rotation speed of the internal combustion engine 1 (hereinafter referred to as "the heat engine rotation speed") is measured by a heat engine rotation speed sensor 41, which is provided near the output shaft $1s$ of the internal combustion engine 1.

The clutch 6, which functions as the rotation speed ratio-changing means, has a function of changing the ratio of the rotation speed Ns of the Stirling engine 100 (hereinafter referred to as "the exhaust heat recovery means rotation speed) to the heat engine rotation speed Ne, that is, Ns/Ne (hereinafter referred to as "the rotation speed ratio"). When the clutch 6 is brought into engagement, the crankshaft 110 of the Stirling engine 100 and the output shaft $1s$ of the internal combustion engine 1 are directly connected with the exhaust heat recovery means transmission 5 and the internal combustion engine transmission 4 interposed therebetween. As a result, the crankshaft 110 of the Stirling engine 100 and the output shaft $1s$ of the internal combustion engine 1 rotate at a fixed rotation speed ratio Ns/Ne that is determined by the gear ratio, or the speed ratio of the exhaust heat recovery means transmission 5 and the internal combustion engine transmission 4 irrespective of whether the increase in the exhaust heat recovery means rotation speed Ns follows the increase in the heat engine rotation speed Ne.

On the other hand, when the clutch 6 is released, the output shaft $1s$ of the internal combustion engine 1 rotates independently of the crankshaft 110 of the Stirling engine 100. If the clutch 6 is released when the increase in the exhaust heat recovery means rotation speed Ns lags behind the increase in the heat engine rotation speed Ne, the rotation speed ratio Ns/Ne becomes smaller than that when the clutch 6 is engaged. Thus, by releasing the clutch 6, it is possible to reduce the rotation speed ratio Ns/Ne to a smaller rotation speed ratio than that when the clutch 6 is engaged. In other words, the clutch 6 serves as the rotation speed ratio-changing means that changes the rotation speed ratio Ns/Ne. It should be noted that the rotation speed ratio Ns/Ne may be zero (that is, Ns=0).

The clutch 6 is provided between the output shaft $1s$ of the internal combustion engine 1 and the crankshaft 110, which functions as the output shaft of the Stirling engine 100 with the internal combustion engine transmission 4 and the exhaust heat recovery means transmission 5 interposed between the clutch 6 and the output shaft $1s$. The clutch 6 cuts and establishes the mechanical connection between the output shaft $1s$ of the internal combustion engine 1 and the crankshaft 110 of the Stirling engine 100 as needed. The clutch 6 is controlled by an operation controller 30 of the exhaust heat recovery apparatus according to the first embodiment. As described later, in the first embodiment, the operation controller 30 is provided in an engine ECU (Electronic Control Unit) 50.

The exhaust heat recovery means transmission 5 may be constructed so as to be able to change the gear ratio, or the speed ratio between the output shaft and an input shaft $5s$. Because the response of the output (rotation speed) of the Stirling engine 100 to heat input is low, it is difficult to rapidly change the rotation speed. However, if the gear ratio, or the speed ratio can be changed in this way, it is possible to combine the motive power from the Stirling engine 100 and the motive power from the internal combustion engine 1 over a wide range of the heat engine rotation speed Ne.

Figure 5:
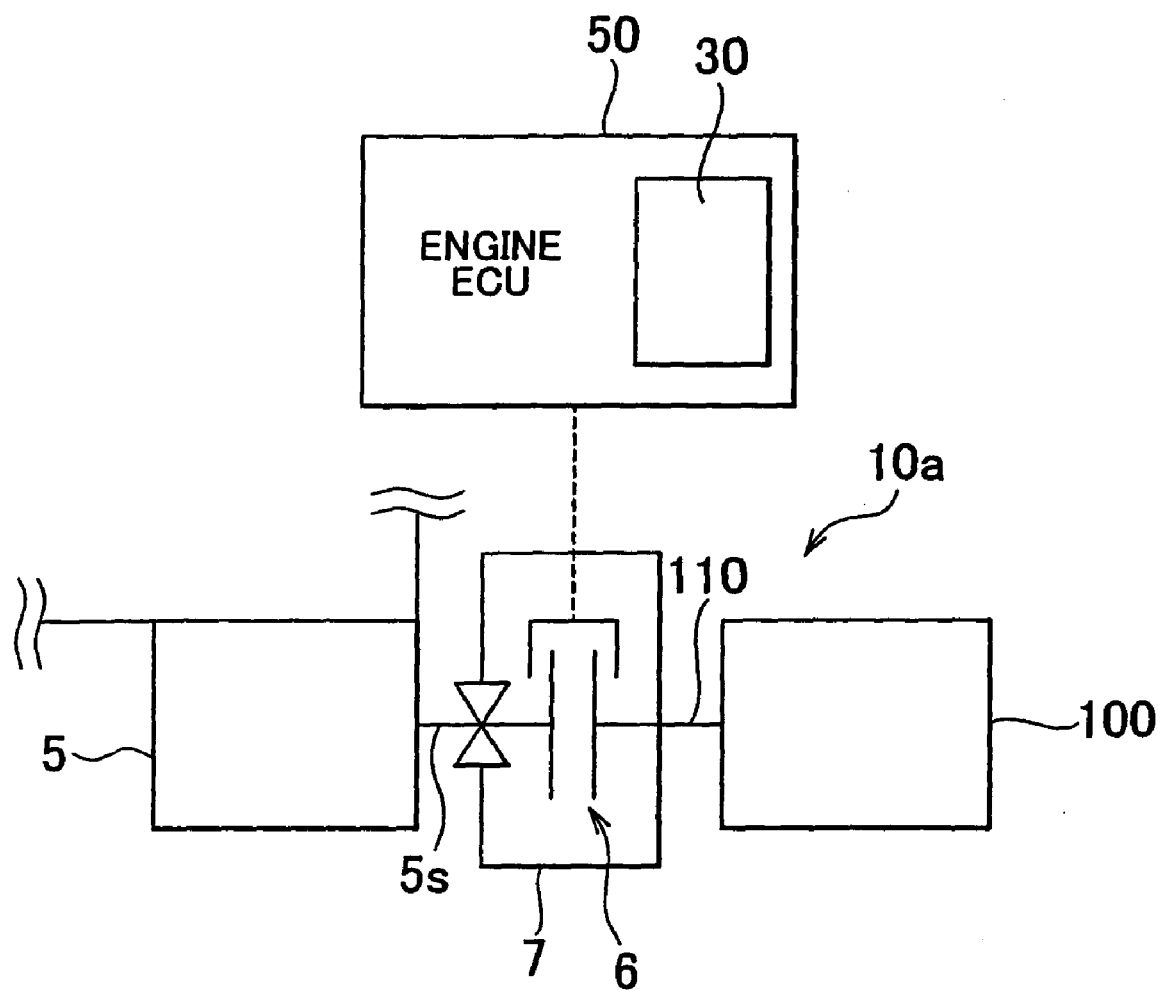
FIG. 5 is an explanatory diagram showing another example of the configuration of a rotation speed ratio-changing means that the exhaust heat recovery apparatus of the first embodiment includes.

FIG. 5 is an explanatory diagram showing another example of the configuration of the rotation speed ratio-changing means that the exhaust heat recovery apparatus of the first embodiment includes. The rotation speed ratio-changing means with which the exhaust heat recovery apparatus 10a is provided includes the clutch 6, which is controlled by the operation controller 30, and a one-way clutch 7. Both of the clutch 6 and the one-way clutch 7 are provided between the crankshaft 110 of the Stirling engine 100 and the input shaft 5s of the exhaust heat recovery means transmission 5.

The one-way clutch 7 transmits motive power from the crankshaft 110 of the Stirling engine 100 to the input shaft 5s of the exhaust heat recovery means transmission 5. When the clutch 6 is released, and conditions for transmitting the motive power from the input shaft 5s of the exhaust heat recovery means transmission 5 to the crankshaft 110 of the Stirling engine 100 are satisfied, the one-way clutch 7 cuts off the transmission of the motive power between the input shaft 5s and the crankshaft 110. In this way, it is possible to compensate for the instability of the operation of the rotation speed ratio-changing means due to the inaccuracy in controlling the engagement and disengagement of the clutch 6, vibration, etc.

Alternatively, the one-way clutch 7, which transmits the motive power from the crankshaft 110 of the Stirling engine 100 to the input shaft 5s of the exhaust heat recovery means transmission 5, alone may be used as the rotation speed ratio-changing means to cut off and establish the transmission of the motive power between the input shaft 5s and the crankshaft 110. With this configuration, it is possible to simplify the structure of the rotation speed ratio-changing means. In this case, because the Stirling engine 100 cannot be started by the motive power of the internal combustion engine 1, it is necessary to provide a means for starting the Stirling engine 100. Next, the operation controller 30 used to control the exhaust heat recovery apparatus 10 according to the first embodiment will be described.

Figure 6:
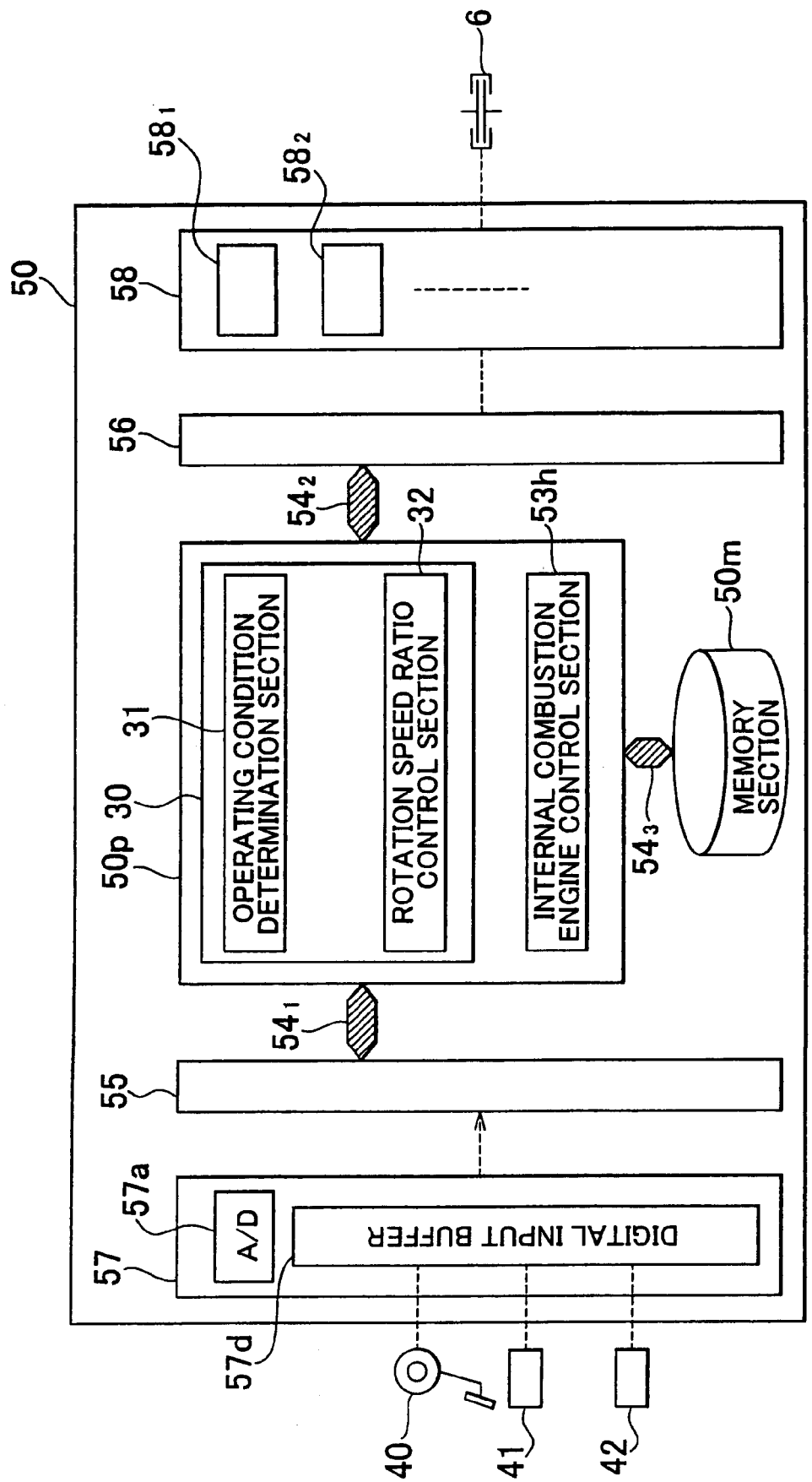
FIG. 6 is an explanatory diagram showing the configuration of an operation controller used to control the operation of the exhaust heat recovery apparatus of the first embodiment.

FIG. 6 is an explanatory diagram showing a configuration of the operation controller used to control the operation of the exhaust heat recovery apparatus according to the first embodiment. As shown in FIG. 6, the operation controller 30 of the first embodiment is incorporated into the engine ECU 50. The engine ECU 50 includes a CPU (Central Processing Unit) 50p, a memory section 50m, input and output ports 55 and 56, and input and output interfaces 57 and 58.

Alternatively, the operation controller 30 according to the first embodiment may be prepared separately from the engine ECU 50, and may be connected to the engine ECU 50. For the purpose of realizing the operation control of the exhaust heat recovery apparatus according to the first embodiment, the exhaust heat recovery apparatus may be configured so that the operation controller 30 can use the function of controlling the Stirling engine 100 etc. that the engine ECU 50 has.

The operation controller 30 includes an operating condition determination section 31 and a rotation speed ratio control section 32. These sections perform the operation control according to the first embodiment. In the first embodiment, the operation controller 30 is incorporated into the CPU 50p that constitutes the engine ECU 50. In addition, the CPU 50p is provided with an internal combustion engine control section 53h, and controls the operation of the internal combustion engine 1 using this section.

The CPU 50p is connected to the input port 55, the output port 56 and the memory section 50m through buses 541 to 543. Thus, the operating condition determination section 31 and the rotation speed ratio control section 32, which constitute the operation controller 30, can exchange control data with each other, and one of these sections can send commands to the other section. In addition, the operation controller 30 can acquire operation control data of the internal combustion engine 1, the Stirling engine 100, etc. from the engine ECU 50, and use the data. Moreover, the operation controller 30 allows the operation control according to the first embodiment to interrupt the operation control routine with which the engine ECU 50 is previously provided.

The input interface 57 is connected to the input port 55. Connected to the input interface 57 are an accelerator operation amount sensor 40, a heat engine rotation speed sensor 41, a vehicle speed sensor 42, etc., which are the sensors to obtain information necessary to perform operation control of the exhaust heat recovery apparatus. The signals output from these sensors are sent to the input port 55 after being converted into the signals that the CPU 50p can use through an A/D converter 57a and a digital input buffer 57d in the input interface 57. Thus, the CPU 50p can acquire the information necessary to perform operation control of the internal combustion engine, and operation control of the exhaust heat recovery apparatus.

The output interface 58 is connected to the output port 56. Controlled objects (the clutch 6 in the first embodiment) necessary to perform the operation control are connected to the output interface 58. The output interface 58 is provided with the control circuit $58_1$, $58_2$, etc., and operates the controlled objects according to the control signals that are calculated and generated in the CPU 50p. With this configuration, the CPU 50p of the engine ECU 50 can control the Stirling engine 100 and the internal combustion engine 1 according to the output signals from the sensors.

Stored in the memory section 50m are control maps and computer programs including the procedure of the operation control according to the first embodiment, or control data, control maps, etc. that are used to perform the operation control according to the first embodiment. The memory section 50m may be a volatile memory, such as a RAM (Random Access Memory), a nonvolatile memory, such as a flush memory, or a combination thereof.

The above computer programs may realize the procedure of the operation control according to the first embodiment in combination with the computer programs already stored in the CPU 50p. The operation controller 30 may realize the functions of the operating condition determination section 31 and the rotation speed ratio control section 32 using the a dedicated hardware instead of the computer programs. Next, the operation control according to the first embodiment will be described. Please refer to FIGS. 1 to 6 if necessary in reading the following description. The above-described operation controller 30 realizes the operation control according to the first embodiment.

Figure 7:
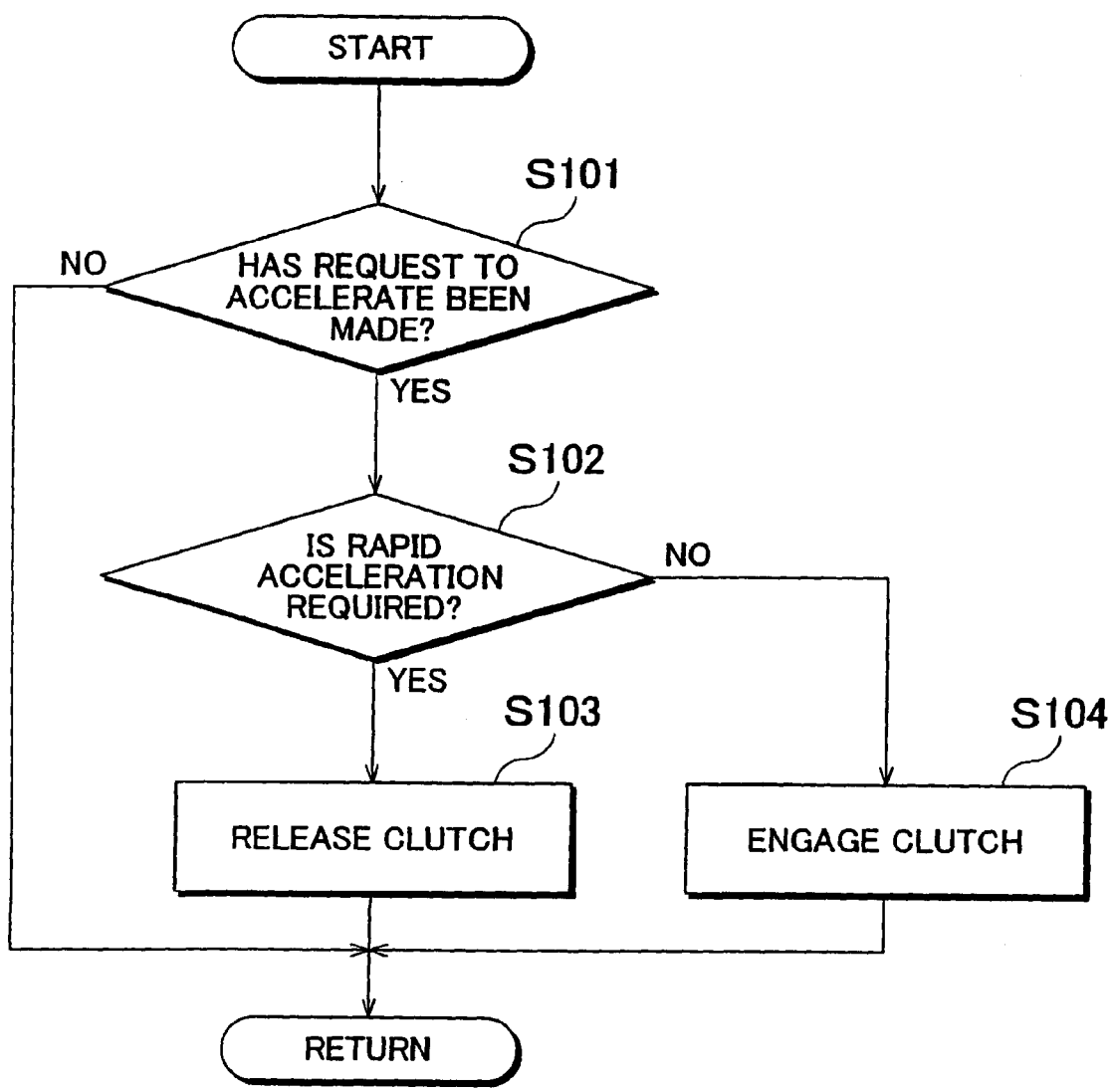
FIG. 7 is a flow chart showing the procedure of the operation control of the exhaust heat recovery apparatus of the first embodiment.

FIG. 7 is a flow chart showing the procedure of the operation control of the exhaust heat recovery apparatus according to the first embodiment. In performing the operation control of the exhaust heat recovery apparatus according to the first embodiment, the operating condition determination section 31 that the operation controller 30 includes determines whether a request to accelerate the vehicle on which the internal combustion engine 1 and the exhaust heat recovery apparatus 10 has been made (S101). Whether the acceleration request has been made is determined based on the operation amount and the operation velocity of the accelerator pedal 40p, which are acquired from the accelerator pedal operation amount sensor 40, for example. If there is no request to accelerate the vehicle (No in step S101), the routine is exited, and the operation controller 30 continues to monitor the operational status of the internal combustion engine 1.

If a request to accelerate the vehicle has been made (Yes in step S101), the operating condition determination section 31 determines whether the acceleration request requires rapid acceleration (S102). In the first embodiment, whether the increase in the exhaust heat recovery means rotation speed Ns of the Stirling engine 100 lags behind the increase in the heat engine rotation speed Ne is determined based on whether rapid acceleration is required. In this way, it is possible to relatively easily determine whether the increase in the exhaust heat recovery means rotation speed Ns of the Stirling engine 100 lags behind the increase in the heat engine rotation speed Ne.

Whether rapid acceleration is required may be determined in the following way. First, the motive power produced by the Stirling engine 100 is estimated from the temperature of the exhaust gas Ex and the temperature of the heater 105 of the Stirling engine 100, for example. Subsequently, a comparison is made between the estimated acceleration of the exhaust heat recovery apparatus that is the acceleration by which the produced motive power accelerates the inertia of the Stirling engine 100 (the inertia of the rotary body), and the required acceleration of the internal combustion engine 1 that is calculated from the operation amount and the operation velocity of the accelerator pedal 40p, for example. If the comparison result shows that the estimated acceleration of the exhaust heat recovery apparatus is less than the required acceleration of the internal combustion engine, it is determined that rapid acceleration is required, and the increase in the exhaust heat recovery means rotation speed Ns of the Stirling engine 100 lags behind the increase in the heat engine rotation speed Ne.

If it is determined that the acceleration request does not require rapid acceleration (No in step S102), the rotation speed ratio control section 32 engages the clutch 6 (S104). In this case, even if a request to accelerate the vehicle is made, there will be no lag in the increase in the exhaust heat recovery means rotation speed Ns of the Stirling engine 100 relative to the increase in the heat engine rotation speed Ne, or the lag therein, if any, will be within acceptable limits. For this reason, the clutch 6 is engaged, and the motive power that the Stirling engine 100 produces by recovering the thermal energy of the exhaust gas Ex is output from the output shaft 9 together with the motive power produced by the internal combustion engine 1.

If it is determined that the request to accelerate the vehicle requires rapid acceleration (Yes in step S102), the rotation speed ratio control section 32 releases the clutch 6 (S103) to cut off the mechanical connection between the Stirling engine 100 and the internal combustion engine 1. If it is determined that the acceleration request requires rapid acceleration, the heat engine rotation speed Ne will be rapidly increased, there will be a lag in the increase in the exhaust heat recovery means rotation speed Ns of the Stirling engine 100 relative to the increase in the heat engine rotation speed Ne, and the lag causes the internal combustion engine 1 to drive the Stirling engine 100. Specifically, part of the motive power produced by the internal combustion engine 1 is used to drive the Stirling engine 100, which causes a load to the internal combustion engine 1. As a result, it becomes impossible to achieve required acceleration performance. Trying to achieve the required acceleration performance can make the fuel consumption of the internal combustion engine 1 worse.

For this reason, the Stirling engine 100 and the internal combustion engine 1 are disconnected from each other by releasing the clutch 6 so that the motive power produced by the internal combustion engine 1 is not used by the Stirling engine 100. In this way, it is possible to achieve the required acceleration performance, and it is also possible to restrict the increase in the fuel consumption of the internal combustion engine 1. In the operation control of the exhaust heat recovery apparatus according to the first embodiment, if the clutch 6 is released when the increase in the exhaust heat recovery means rotation speed Ns lags behind the increase in the heat engine rotation speed Ne, the rotation speed ratio Ns/Ne becomes smaller than that when the increase in the exhaust heat recovery means rotation speed Ns follows the increase in the heat engine rotation speed Ne.

As described above, in the first embodiment, the rotation speed ratio-changing means that transmits the motive power produced by the exhaust heat recovery means to the heat engine, and changes the ratio of the rotation speed of the exhaust heat recovery means to the rotation speed of the heat engine (rotation speed ratio), is provided between the heat engine and the exhaust heat recovery means. When the increase in the rotation speed of the exhaust heat recovery means lags behind the increase in the rotation speed of the heat engine, the rotation speed ratio is set smaller than that when the rotation speed of the exhaust heat recovery means follows the increase in the rotation speed of the heat engine.

Thus, when the increase in the rotation speed of the exhaust heat recovery means lags behind the increase in the rotation speed of the heat engine, the heat engine and the exhaust heat recovery means are disconnected from each other, whereby the motive power produced by the heat engine is kept from being used by the exhaust heat recovery means. As a result, the degradation of the acceleration performance can be minimized, and it is also possible to restrict the increase in the fuel consumption. The apparatus that has a configuration similar to that described in relation to the first embodiment will exhibit the operations and effects similar to those of the first embodiment. In addition, the configuration described in relation to the first embodiment can be used in a second embodiment described below, as appropriate.

Next, the second embodiment will be described. The second embodiment is almost the same as the first embodiment in its configuration, except that a rotation speed ratio-changing means that changes the ratio of the rotation speed of the Stirling engine to the rotation speed of the internal combustion engine among a plurality of ratios or continuously, is provided between the output shaft of the Stirling engine, which functions as the exhaust heat recovery means, and the output shaft of the internal combustion engine, which functions as the heat engine. In the other points, the exhaust heat recovery apparatus according to the second embodiment is similar to that of the first embodiment. First, the configuration of an exhaust heat recovery apparatus according to the second embodiment will be described.

Figure 8:
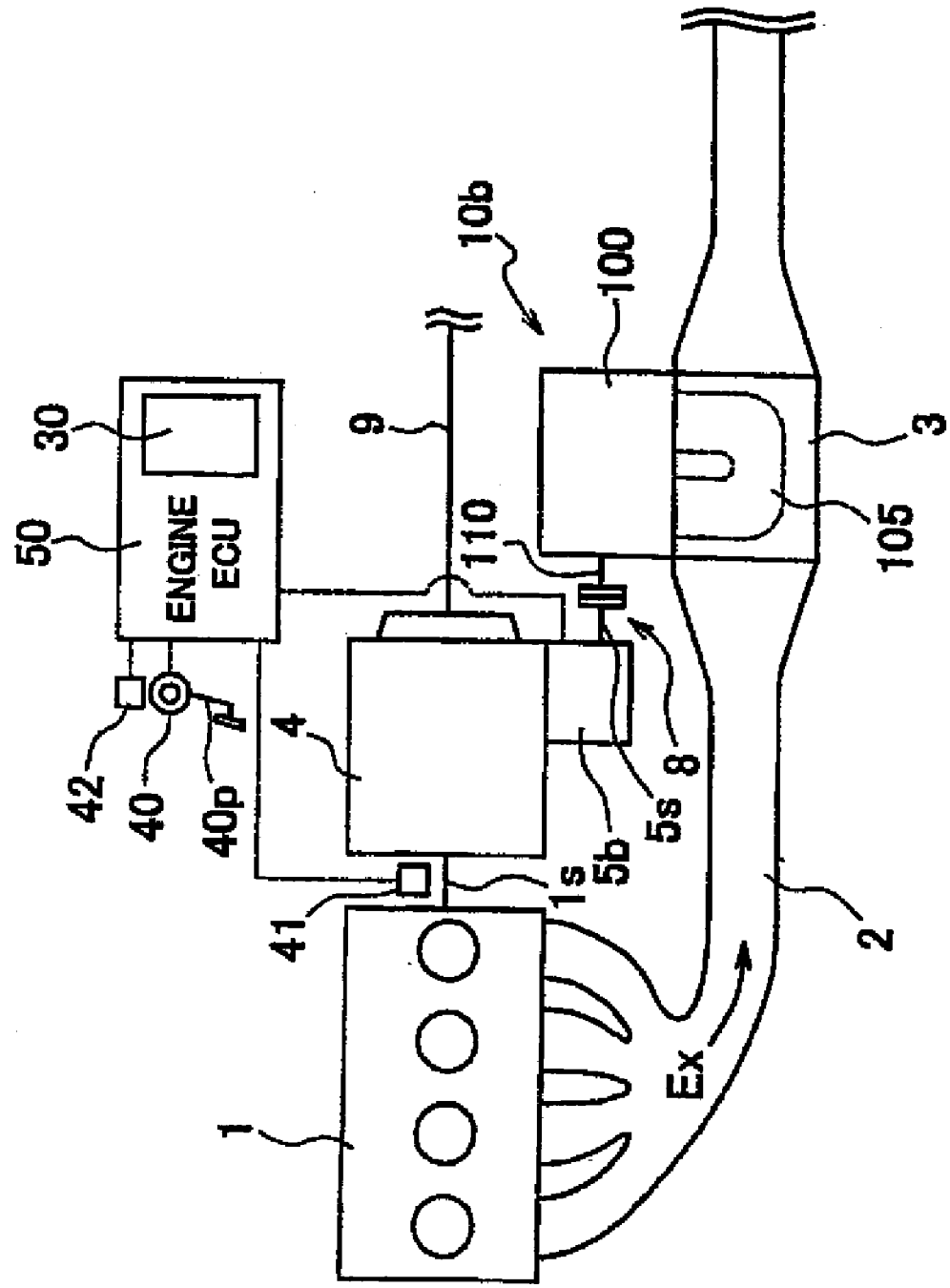
FIG. 8 is an overall view showing the configuration of an exhaust heat recovery apparatus of a second embodiment.

FIG. 8 is an overall view showing the configuration of the exhaust heat recovery apparatus according to the second embodiment. The exhaust heat recovery apparatus 10b according to the second embodiment includes the exhaust heat recovery means and the rotation speed ratio-changing means, which is provided between the output shaft of the heat engine and the output shaft of the exhaust heat recovery means. In the second embodiment, the above-described Stirling engine 100 is used as the exhaust heat recovery means, and the reciprocating internal combustion engine 1 is used as the heat engine. An exhaust heat recovery means transmission 5b is used as the rotation speed ratio-changing means.

The exhaust heat recovery means transmission 5b changes the rotation speed ratio Ns/Ne by changing the gear ratio, or the speed ratio thereof. A belt-type CVT (Continuous Variable Transmission), a toroidal CVT, or a rotation speed-changing device with finite gear ratios may be used as the exhaust heat recovery means transmission 5b. The rotation speed ratio Ns/Ne of the exhaust heat recovery means transmission 5b is changed by the operation controller 30 of the second embodiment.

The crankshaft 110, which functions as the output shaft of the Stirling engine 100 is coupled to the input shaft 5s of the exhaust heat recovery means transmission 5b using a coupling 8. A clutch may be provided between the crankshaft 110 and the input shaft 5s as in the case of the first embodiment. The motive power from the Stirling engine 100 is transmitted to the exhaust heat recovery means transmission 5b through the coupling 8. The output shaft 1s of the internal combustion engine 1 is connected to the internal combustion engine transmission 4. The internal combustion engine transmission 4 combines the motive power from the internal combustion engine 1 and the motive power from the Stirling engine 100, which is output from the exhaust heat recovery means transmission 5b, and outputs the resultant power to an output shaft 9.

The heat engine rotation speed Ne is measured by the heat engine rotation speed sensor 41, which is placed near the output shaft 1s of the internal combustion engine 1. Next, the operation control of the exhaust heat recovery means according to the second embodiment will be described. The operation control of the exhaust heat recovery means according to the second embodiment can be carried out by the operation controller 30 described in relation to the first embodiment (see FIG. 6).

Figure 9:
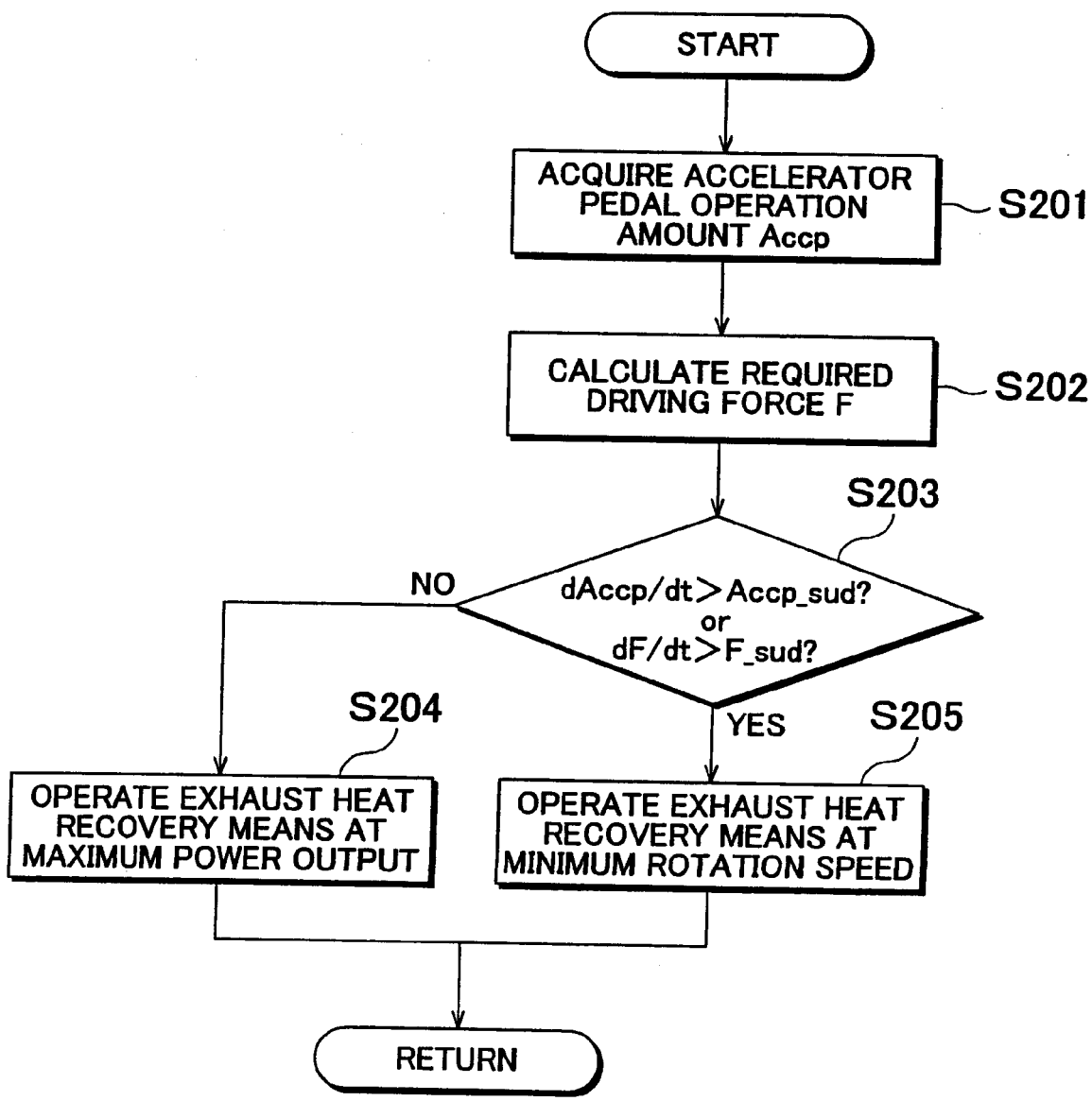
FIG. 9 is a flow chart showing the procedure of the operation control of the exhaust heat recovery apparatus of the second embodiment.
Figure 10:
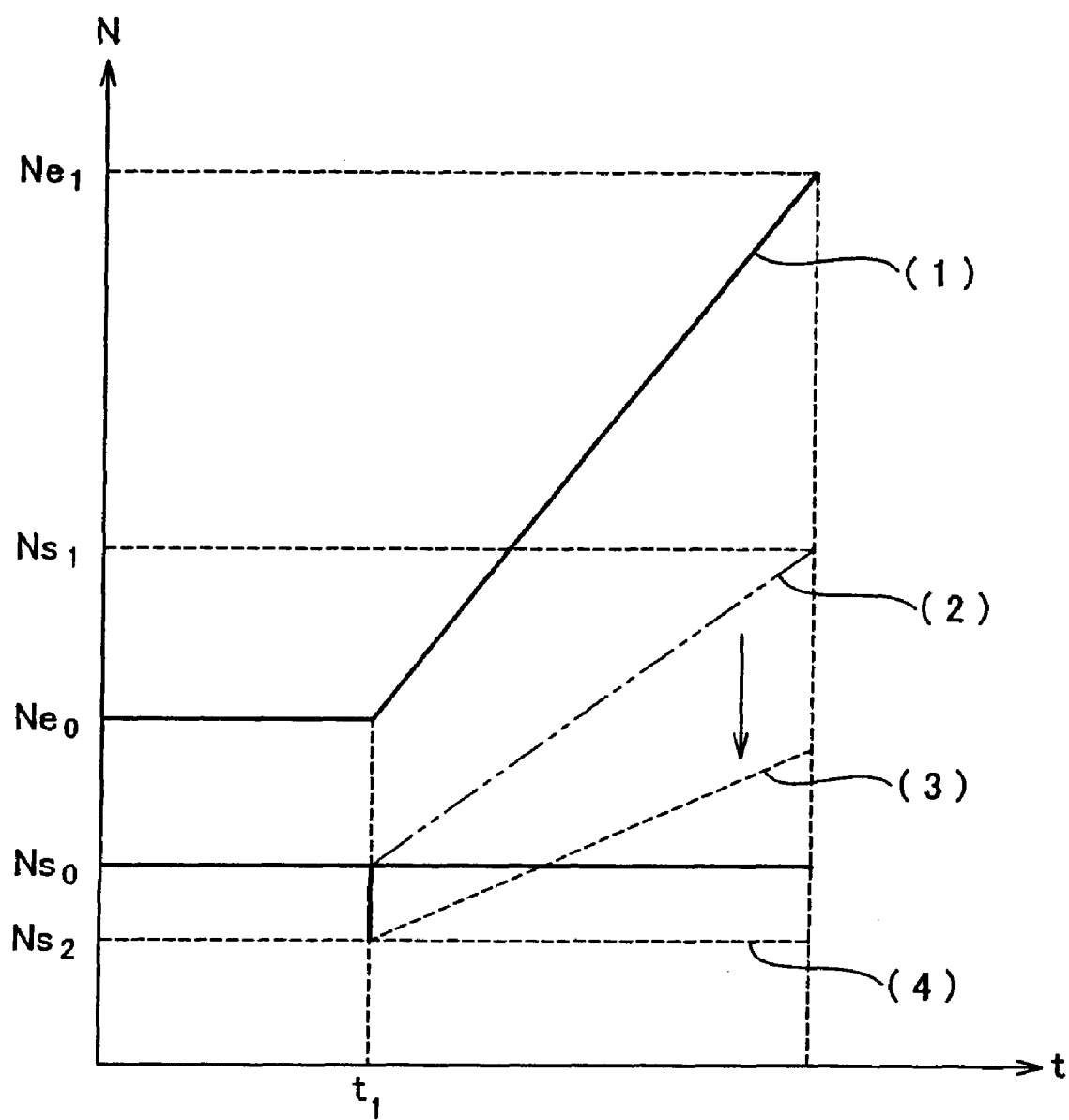
FIG. 10 is an explanatory diagram showing the variation of the rotation speed of an internal combustion engine and the rotation speed of a Stirling engine with time.

FIG. 9 is a flow chart showing the procedure of the operation control of the exhaust heat recovery apparatus according to the second embodiment. FIG. 10 is an explanatory diagram showing the variation of the rotation speed of the internal combustion engine and the rotation speed of the Stirling engine with time. If rapid acceleration is required of the vehicle on which the internal combustion engine 1 and the exhaust heat recovery apparatus 10b are mounted, the heat engine rotation speed Ne varies from $Ne_0$ to $Ne_1$ as shown by the solid line (1) in FIG. 10.

If the gear ratio, or the speed ratio (rotation speed ratio) of the exhaust heat recovery means transmission 5b is fixed, the exhaust heat recovery means rotation speed Ns of the Stirling engine 100 increases, keeping a certain proportion thereof to the heat engine rotation speed Ne as shown by the a chain double-dashed line (2) in FIG. 10. If the increase in the exhaust heat recovery means rotation speed Ns follows the increase in the heat engine rotation speed Ne, the Stirling engine 100 does not use the motive power from the internal combustion engine 1.

However, because the response of the output (rotation speed) of the Stirling engine 100 to heat input is low, if the heat engine rotation speed Ne is rapidly increased when rapid acceleration is required ($t=t_1$ in FIG. 10), for example, the increase in the exhaust heat recovery means rotation speed Ns can lag behind the increase in the heat engine rotation speed Ne. In this case, the Stirling engine 100 uses the motive power from the internal combustion engine 1, and the internal combustion engine 1 therefore cannot exhibit the required acceleration performance.

Accordingly, in the second embodiment, when the increase in the exhaust heat recovery means rotation speed Ns lags behind the increase in the heat engine rotation speed Ne, the rotational inertia of the Stirling engine 100 is reduced. More specifically, the rotation speed ratio Ns/Ne is made smaller than that when the increase in the exhaust heat recovery means rotation speed Ns follows the increase in the heat engine rotation speed Ne so that the exhaust heat recovery means rotation speed Ns becomes less than that when the increase in the exhaust heat recovery means rotation speed Ns follows the increase in the heat engine rotation speed Ne. In this way, it becomes possible to keep the exhaust heat recovery means rotation speed Ns of the Stirling engine 100 approximately $Ns_0$ before and after rapid acceleration is required (the dotted line indicated by (3) in FIG. 10).

As a result, the rotational inertia of the Stirling engine 100 decreases as compared to the case where the exhaust heat recovery means rotation speed Ns varies as shown by the chain double-dashed line (2) in FIG. 10. Even if the increase in the exhaust heat recovery means rotation speed Ns lags behind the increase in the heat engine rotation speed Ne, it is possible to keep low the consumption of the motive power from the internal combustion engine 1 by the Stirling engine 100, so that it is possible to minimize the reduction of the acceleration performance.

The chain line (4) in FIG. 10 shows an example in which the rotation speed ratio Ns/Ne is controlled so that the Stirling engine 100 is operated at the exhaust heat recovery means rotation speed $Ns=Ns_2$ that is the minimum rotation speed at which the Stirling engine 100 can operate. With this operation, the internal combustion engine 1 is driven by the Stirling engine 100, so that it is possible to effectively use the motive power produced by the Stirling engine 100 to accelerate the vehicle. As a result, it is possible to enhance the acceleration performance.

In performing the operation control according to the second embodiment, the operating condition determination section 31 that the operation controller 30 includes acquires an accelerator pedal operation amount Accp from the accelerator pedal operation amount sensor 40 (S201). The operating condition determination section 31 then calculates a required driving force F required when the accelerator pedal is operated by the accelerator pedal operation amount Accp, using the acquired accelerator pedal operation amount Accp, the heat engine rotation speed Ne, and the vehicle speed V of the vehicle that is driven by the internal combustion engine 1 (S202). The heat engine rotation speed Ne and the vehicle speed V are acquired from the heat engine rotation speed sensor 41 and the vehicle speed sensor 42, respectively.

The operating condition determination section 31 calculates a differential value (accelerator pedal operation amount-differential value) dAccp/dt that is obtained by differentiating the acquired accelerator pedal operation amount Accp with respect to time, and calculates a differential value (required driving force differential value) dF/dt that is obtained by differentiating the required driving force F with respect to time. The operating condition determination section 31 compares the accelerator pedal operation amount-differential value dAccp/dt and an accelerator pedal operation amount-threshold value Accp_sud, and compares the required driving force-differential value dF/dt and a required driving force-threshold value F_sud (S203).

If dAccp/dt≦Accp_sud, and dF/dt≦F_sud (No in step S203), the operating condition determination section 31 determines that rapid acceleration is not required of the vehicle on which the internal combustion engine 1 and the exhaust heat recovery apparatus 10b are mounted. In response to this determination, the rotation speed ratio control section 32 of the operation controller 30 controls the rotation speed ratio Ns/Ne so that the Stirling engine 100 is operated so as to produce the maximum motive power (S204). In this way, it is possible to improve the exhaust heat recovery efficiency of the Stirling engine 100.

If dAccp/dt>Accp_sud, and dF/dt>F_sud (Yes in step S203), the operating condition determination section 31 determines that rapid acceleration is required. In response to this determination, the rotation speed ratio control section 32 of the operation controller 30 controls the rotation speed ratio Ns/Ne so that the rotational inertia of the Stirling engine 100 decreases. In the second embodiment, the rotation speed ratio of the exhaust heat recovery means transmission 5b is controlled so that the Stirling engine 100 is operated at the minimum rotation speed at which the Stirling engine 100 can operate (S205). In this way, even if rapid acceleration is required, it is possible to drive the internal combustion engine 1 using the Stirling engine 100, and it is therefore possible to improve the acceleration performance.

As described above, in the second embodiment, the rotation speed ratio-changing means that changes the ratio of the rotation speed of the exhaust heat recovery means to the rotation speed of the heat engine, is provided between the output shaft of the exhaust heat recovery means and the output shaft of the heat engine from which exhaust heat is recovered. When rapid acceleration is required and the increase in the rotation speed of the exhaust heat recovery means lags behind the increase in the rotation speed of the heat engine, the rotation speed ratio is made smaller than that when the increase in the exhaust heat recovery means rotation speed follows the increase in the heat engine rotation speed. If rapid acceleration is not required, the rotation speed ratio is set so that the exhaust heat recovery means is operated so as to produce the maximum motive power.

In this way, even if the increase in the rotation speed of the exhaust heat recovery means lags behind the increase in the rotation speed of the heat engine, the consumption of the motive power from the heat engine by the exhaust heat recovery means is minimized. As a result, it is possible to minimize the reduction in the acceleration performance, and it is also possible to restrict the increase in the fuel consumption under such conditions. In addition, if rapid acceleration is not required, the exhaust heat recovery means is operated so as to produce the maximum motive power, which improves the exhaust heat recovery efficiency.

Next, a modified example of the second embodiment will be described. The modified example of the second embodiment is almost the same as the second embodiment in its configuration, except that, if rapid acceleration has not been required for a predetermined time period, the rotation speed ratio is set so that the exhaust heat recovery means is operated so as to produce the maximum motive power. In the other points, the exhaust heat recovery apparatus according to the modified example of the second embodiment is similar to that of the second embodiment.

Figure 11:
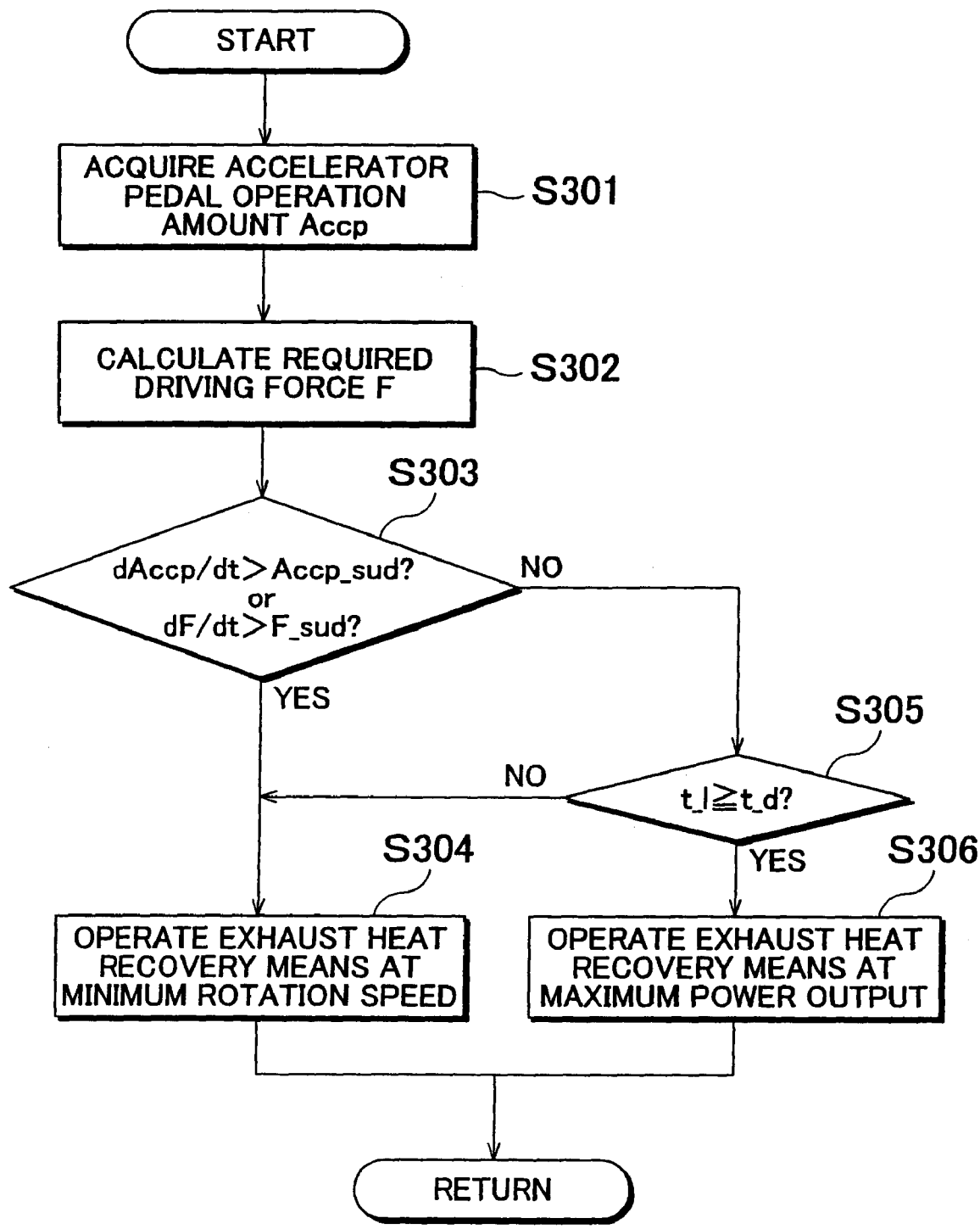
FIG. 11 is a flow chart showing the procedure of the operation control of an exhaust heat recovery apparatus of a modified example of the second embodiment.
Figure 12:
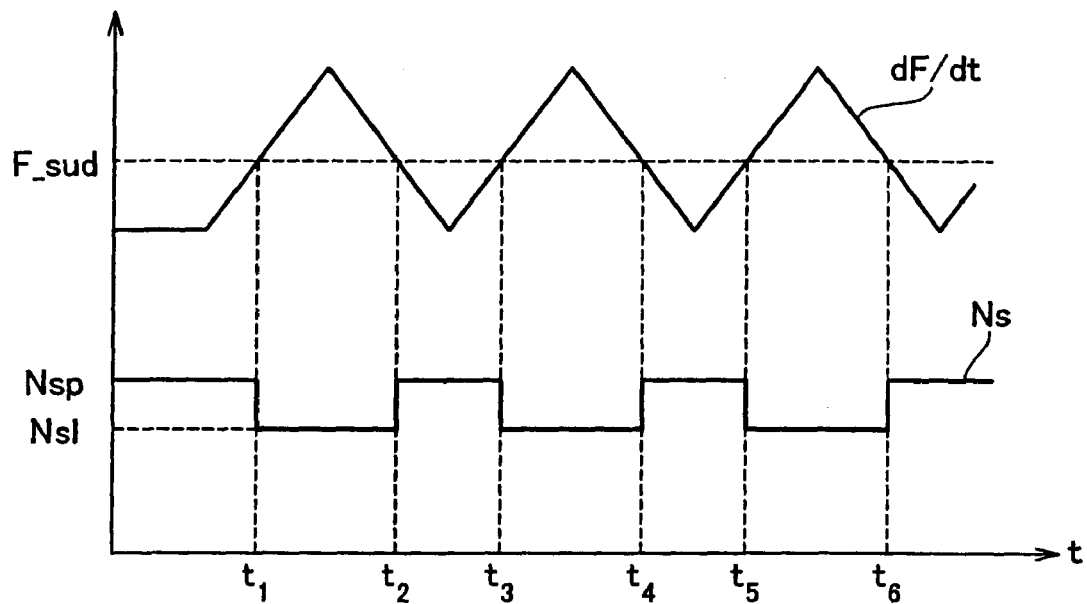
FIG. 12 is an explanatory diagram in which both of the variation of the differential value of required driving force with time, and the corresponding variation of the rotation speed of the Stirling engine with time are drawn.
Figure 13:
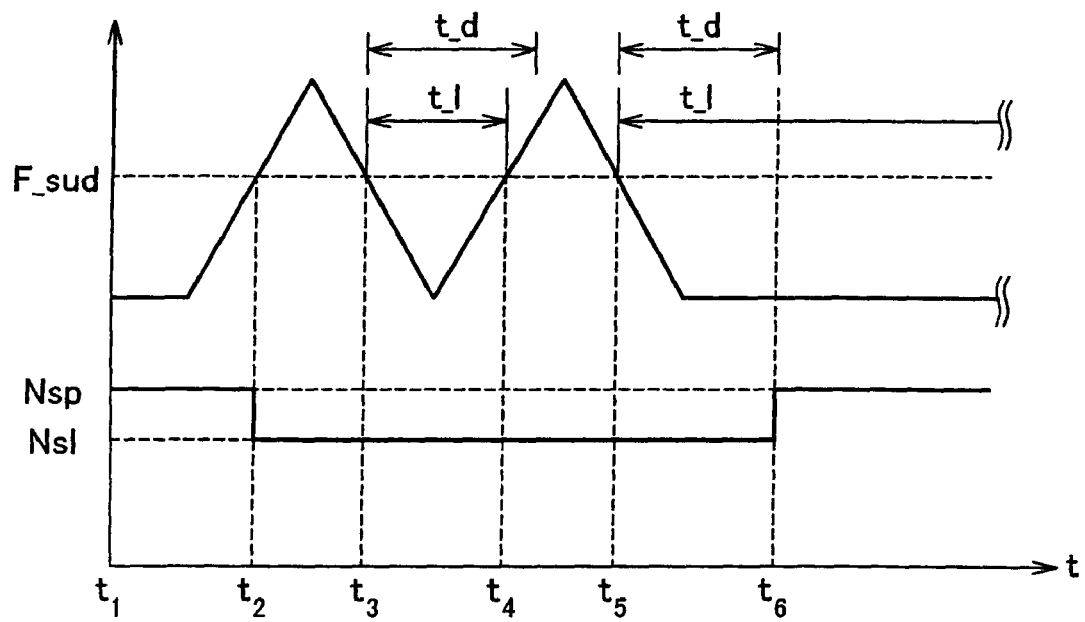
FIG. 13 is an explanatory diagram in which both of the variation of the differential value of required driving force with time, and the corresponding variation of the rotation speed of the Stirling engine with time are drawn.

FIG. 11 is a flow chart showing the procedure of the operation control of the exhaust heat recovery apparatus according to the modified example of the second embodiment. FIGS. 12 and 13 are explanatory diagrams in which both of the variation of the differential value of the required driving force with time, and the corresponding variation of the rotation speed of the Stirling engine with time are drawn. In performing the operation control according to the modified example of the second embodiment, the operating condition determination section 31 that the operation controller 30 includes acquires an accelerator pedal operation amount Accp from the accelerator pedal operation amount sensor 40 (S301). The operating condition determination section 31 then calculates a corresponding required driving force F using the acquired accelerator pedal operation amount Accp, the heat engine rotation speed Ne, and the vehicle speed V (S302). The heat engine rotation speed Ne and the vehicle speed V are acquired from the heat engine rotation speed sensor 41 and the vehicle speed sensor 42, respectively.

The operating condition determination section 31 calculates a differential value (accelerator pedal operation amount-differential value) dAccp/dt of the acquired accelerator pedal operation amount, and calculates a differential value (required driving force differential value) dF/dt of the required driving force F. The operating condition determination section 31 compares the accelerator pedal operation amount-differential value dAccp/dt and an accelerator pedal operation amount-threshold value Accp_sud, and compares the required driving force-differential value dF/dt and a required driving force-threshold value F_sud (S303).

If $dAccp/dt \leq Accp\_sud$, and $dF/dt \leq F\_sud$ (No in step S303), the operating condition determination section 31 determines that rapid acceleration is not required, and the rotation speed ratio Ns/Ne of the exhaust heat recovery means transmission 5b is controlled so that the Stirling engine 100 is operated so as to produce the maximum motive power. As a result, the Stirling engine 100 is operated at the exhaust heat recovery means rotation speed Ns=Nsp (up to $t=t_1$, $t=t_2$ to $t_3$, $t=t_4$ to $t_5$, etc.) as shown in FIG. 12.

If rapid acceleration is required immediately after the rotation speed ratio of the exhaust heat recovery means transmission 5b is controlled so that the Stirling engine 100 is operated so as to produce the maximum motive power, the rotation speed ratio Ns/Ne is controlled so that the rotational inertia of the Stirling engine 100 decreases. In this case, the Stirling engine 100 is operated at the exhaust heat recovery means rotation speed Ns=Ns$_1$ as shown in FIG. 12, for example ($t=t_1$ to $t_2$, $t=t_3$ to $t_4$, etc.). Then, the rotation speed ratio Ns/Ne frequently varies in response to the variation of dF/dt, which can cause hunting (oscillation in the control response) in the exhaust heat recovery means rotation speed Ns.

In the operation control according to the second embodiment, if rapid acceleration has not been required for a predetermined time period, the rotation speed ratio Ns/Ne is controlled so that the Stirling engine 100 is operated so as to produce the maximum motive power. Accordingly, it is possible to suppress the hunting. In order to determine whether rapid acceleration has not been required for a predetermined time period, the modified example uses a predetermined time period t_d (see FIG. 13). The time period t_d can be obtained through experiments and/or analyses.

If $dAccp/dt \leq Accp\_sud$, and $dF/dt \leq F\_sud$ (No in step S303), the operating condition determination section 31 determines whether the time period t_1 for which rapid acceleration has not been required has become longer than the predetermined time period t_d (S305). The time period t_1 is the time period for which rapid acceleration has not been required, and more specifically, the time period for which a state where $dAccp/dt \leq Accp\_sud$, and $dF/dt \leq F\_sud$ are satisfied has lasted.

Once $t\_1 \geq t\_d$ is satisfied (Yes in step S305; after $t=t6$ in FIG. 13), the rotation speed ratio control section 32 of the operation controller 30 controls the rotation speed ratio Ns/Ne so that the Stirling engine 100 is operated so as to produce the maximum motive power (S306). In this case, the Stirling engine 100 is operated at the exhaust heat recovery means rotation speed Ns=Nsp. Thus, it is possible to suppress the hunting of the exhaust heat recovery means rotation speed Ns, and it is also possible to increase the exhaust heat recovery efficiency of the Stirling engine 100.

If $t\_1 < t\_d$ (No in step S305; $t=t_3$ to $t_4$ in FIG. 13), the operating condition determination section 31 determines that rapid acceleration is required before the predetermined time period t_d has elapsed. In this case, the rotation speed ratio control section 32 of the operation controller 30 controls the rotation speed ratio Ns/Ne so that a state where the rotational inertia of the Stirling engine 100 is low is maintained. Specifically, the rotation speed ratio Ns/Ne is controlled so that the Stirling engine 100 is kept operating at the minimum rotation speed Ns1 at which the Stirling engine 100 can operate (S304). In this way, it is possible to suppress the hunting of the exhaust heat recovery means rotation speed Ns, and it is also possible to reduce the possibility that the Stirling engine 100 uses the motive power from the internal combustion engine 1.

In the modified example of the second embodiment described above, if rapid acceleration has not been required for a predetermined time period, the rotation speed ratio is set so that the exhaust heat recovery means is operated so as to produce the maximum motive power. In this way, it is made possible to minimize the possibility that, when the rotation speed ratio is changed depending on whether rapid acceleration has been required before the predetermined time has elapsed, the rotation speed ratio of the exhaust heat recovery means transmission 5b frequently varies, which causes the hunting of the exhaust heat recovery means rotation speed.

As described above, the exhaust heat recovery apparatus according to the present invention is useful to recover the exhaust heat of a heat engine, and in particular suitable for minimizing the degradation of the acceleration performance by suppressing the reduction in the power output from the heat engine, from which exhaust heat is recovered.

The invention claimed is:

1. An exhaust heat recovery apparatus, comprising:
   an exhaust heat recovery device that produces motive power by recovering thermal energy from exhaust gas from a heat engine, wherein the produced motive power is output together with motive power produced by the heat engine; and
   a rotation speed ratio-changing device including a processor and a memory storing a program executed by the processor to perform a method of setting a rotation speed ratio, the method comprising
   when an increase in the rotation speed of the exhaust heat recovery device lags behind an increase in the rotation speed of the heat engine, setting the ratio of the rotation speed of the exhaust heat recovery device to the rotation speed of the heat engine smaller than that when the increase in the rotation speed of the exhaust heat recovery device follows the increase in the rotation speed of the heat engine,
      wherein the increase in the rotation speed of the exhaust heat recovery device is considered being lag behind the increase in the rotation speed of the heat engine if it is determined that an acceleration requires rapid acceleration, whereas an increase in the rotation speed of the exhaust heat recovery device is not considered being lag behind an increase in the rotation speed of the heat engine if it is determined that an acceleration does not require rapid acceleration, and
      wherein an acceleration is considered being a rapid acceleration if the estimated acceleration of the exhaust heat recovery apparatus is lower than the required acceleration of the heat engine, and
   maintaining the smaller rotation speed ratio for a predetermined time period.

2. The exhaust heat recovery apparatus according to claim 1, wherein
   the rotation speed ratio-changing device includes a clutch that is provided between the heat engine and the exhaust heat recovery device, wherein, when the increase in the rotation speed of the exhaust heat recovery device lags behind the increase in the rotation speed of the heat engine, the clutch is released.

3. The exhaust heat recovery apparatus according to claim 2, further comprising a one-way clutch, provided between the exhaust heat recovery device and the heat engine, for transmitting motive power from the exhaust heat recovery device to the heat engine.

4. An exhaust heat recovery apparatus, comprising:
   an exhaust heat recovery device that produces motive power by recovering thermal energy from exhaust gas from a heat engine, wherein the produced motive power is output together with motive power produced by the heat engine; and
   a rotation speed ratio-changing device including a processor and memory storing a program executed by the processor to perform a method of setting a rotation speed ratio, the method comprising
   when an increase in the rotation speed of the exhaust heat recovery device lags behind an increase in the rotation speed of the heat engine, setting the ratio of the rotation speed of the exhaust heat recovery device to the rotation speed of the heat engine smaller than that when the increase in the rotation speed of the exhaust heat recovery device follows the increase in the rotation speed of the heat engine,
      wherein the increase in the rotation speed of the exhaust heat recovery device is considered being lag behind the increase in the rotation speed of the heat engine if it is determined that an acceleration requires rapid acceleration, whereas an increase in the rotation speed of the exhaust heat recovery device is not considered being lag behind an increase in the rotation speed of the heat engine if it is determined that an acceleration does not require rapid acceleration, and
      wherein an acceleration is considered being a rapid acceleration if the accelerator pedal operation amount-differential value is higher than an accelerator pedal operation amount-threshold value or the required driving force differential value is higher than a required driving force-threshold value, and
   maintaining the smaller rotation speed ratio for a predetermined time period.

5. The exhaust heat recovery apparatus according to claim 4, wherein
   the rotation speed ratio-changing device includes a speed-changing device provided between the heat engine and the exhaust heat recovery device, wherein the rotation speed ratio is changed by changing the speed ratio of the speed-changing device.

6. The exhaust heat recovery apparatus according to claim 5, wherein the method of setting a rotation speed ratio further comprises:
   when the increase in the rotation speed of the exhaust heat recovery device lags behind the increase in the rotation speed of the heat engine, setting the rotation speed ratio so that the rotation speed of the exhaust heat recovery device becomes a rotation speed less than that when the increase in the rotation speed of the exhaust heat recovery device follows the increase in the rotation speed of the heat engine.

7. The exhaust heat recovery apparatus according to claim 6, wherein the method of setting a rotation speed ratio further comprises:
   when the increase in the rotation speed of the exhaust heat recovery device lags behind the increase in the rotation speed of the heat engine, setting the rotation speed of the exhaust heat recovery device to a minimum rotation speed at which the exhaust heat recovery device can operate.

8. The exhaust heat recovery apparatus according to claim 5, wherein the method of setting a rotation speed ratio further comprises:

when the increase in the rotation speed of the exhaust heat recovery device lags behind the increase in the rotation speed of the heat engine, setting the rotation speed ratio so that the rotation speed of the exhaust heat recovery device becomes a rotation speed at which the exhaust heat recovery device produces the maximum motive power.

9. The exhaust heat recovery apparatus according to claim 8, wherein the method of setting a rotation speed ratio further comprises:

when a time period for which rapid acceleration has not been required of the heat engine exceeds a predetermined time period, setting the rotation speed ratio so that the exhaust heat recovery device produces the maximum motive power.

* * * * *